United States Patent
Sirat et al.

(10) Patent No.: US 6,590,654 B1
(45) Date of Patent: Jul. 8, 2003

(54) POLARIZED ILLUMINATION AND DETECTION FOR METROLOGICAL APPLICATIONS

(75) Inventors: Gabriel Y. Sirat, Jerusalem (IL); Yaacov Zerem, Jerusalem (IL); Meny Shy, Aminadav (IL); Valery Deich, Kiryat Arba (IL)

(73) Assignee: Optimet, Optical Metrology Ltd., Jerusalem (IL)

( * ) Notice: Subject to any disclaimer, the term of this patent is extended or adjusted under 35 U.S.C. 154(b) by 36 days.

(21) Appl. No.: 09/788,325

(22) Filed: Feb. 16, 2001

Related U.S. Application Data

(60) Provisional application No. 60/185,418, filed on Feb. 28, 2000.

(51) Int. Cl.[7] .................................................. G01J 4/00
(52) U.S. Cl. ...................................................... 356/369
(58) Field of Search ................................ 356/364–369, 356/41, 42, 491, 35.5, 520, 243.1; 359/484, 495, 485–487, 494, 497, 281, 386, 368, 347; 349/57, 9, 98, 115, 96, 44.23; 362/19, 26; 250/252.1, 559.41

(56) References Cited

U.S. PATENT DOCUMENTS

| | | | | |
|---|---|---|---|---|
| 5,488,599 A | * | 1/1996 | Akiyama et al. | 369/112.28 |
| 5,727,109 A | * | 3/1998 | Pan et al. | 385/140 |
| 5,848,203 A | * | 12/1998 | Kawakami et al. | 385/11 |

* cited by examiner

*Primary Examiner*—Tu T. Nguyen
(74) *Attorney, Agent, or Firm*—Bromberg & Sunstein LLP

(57) ABSTRACT

An apparatus and method for enhancing the proportion of detected light that has been diffusely scattered by a surface light to light specularly reflected from the surface. A beam of light having a direction of predominant polarization is directed through a wedge module so as to illuminate the scene. The wedge module has two optically anisotropic wedges and an optical compensation plate. The polarization axes of the first and second wedges are substantially parallel to the direction of predominant polarization of the illuminating beam. Light scattered by the surface is detected through a polarizer.

3 Claims, 2 Drawing Sheets

POLARIZED ILLUMINATION AND DETECTION FOR METROLOGICAL APPLICATIONS

The present application claims priority from U.S. Provisional Application, Ser. No. 60/185,418, filed Feb. 28, 2000, which is incorporated herein by reference.

FIELD OF THE INVENTION

The present invention relates to optical metrology, and, in particular, to an apparatus and methods for increasing the accuracy of measurement of distance to a reflecting surface.

BACKGROUND ART

Noise levels in optical systems, whether directed toward imaging or measurement of an illuminated object or scene, are detrimentally affected by speckle and by the compound nature of specular and diffuse reflection at a reflecting surface. Speckle arises because of interference effects due to the coherence of the illuminating light.

Light may reach a given detector element via multiple paths. If the light rays reaching the detector from two points on the surface of the illuminated scene bear a defined phase relationship with respect to one another, the detected intensity will be a function of that phase, increasing when the rays are in phase, and decreasing when the rays are out of phase. While useful in certain applications, speckling generally degrades imaging, adding a noise component which may approach the level of the signal itself.

Similarly, if a surface is illuminated by a substantially collimated beam, light that is diffusely scattered from a surface rather than specularly reflected will generally impinge upon the detector plane at angles other than those corresponding to the illuminating beam. One component of the diffuse reflection, however, referred to herein as the "diffuse lobe," is close in direction to that of the specular reflection and similarly close in polarization to specular reflection from a reflecting surface. However, neither the direction nor the polarization are identical to that of specular reflection. In certain metrological applications, it is the diffuse lobe that is of interest since it has characteristics of light emanating from a surface rather than the characteristics of the source of illumination. Specular reflection from a metal surface thus similarly degrades imaging and metrological resolution.

In order to despeckle the illumination, it is useful to decohere any coherent light source. Various methods are known, including the use of a fiber optic multichannel array, as described in U.S. Pat. No. 5,029,975. A survey of known speckle reduction techniques is provided by T. S. McKechnie, "Speckle Reduction," in J. C. Dainty, ed., *Laser Speckle and Related Phenomena,* Springer, Berlin, 1975, pp. 123–170, which is incorporated herein by reference.

One example of a metrological application that may be adversely affected by speckle is that of conoscopy, a form of holography that may be practiced using incoherent light. In ordinary holography, coherent light emanating from a source region is caused to interfere with a coherent reference beam in order to construct an interferogram in which the characteristics of the source region in two or three dimensions are encoded. Conoscopy is a distinct interferometric technique capable of determining the distance to one or more points within an object volume without employing a reference beam. Instead, light emanating from a source region is prepared in a defined state of polarization and then passed through an anisotropic optical element in which one polarization suffers phase retardation with respect to the other. The two polarization components emerging from the anisotropic optical element interfere with one another, producing a interferogram in the detector plane. Conoscopy is the subject of various patents, including U.S. Pat. Nos. 4,602,844, 4,976,504, 5,081,540, and 5,081,541, which patents are incorporated herein by reference. The source region may be illuminated with a grid (or "cloud") of points, or with a line. However interference effects attributable to the coherence of the source are detrimental to the sensitivity of the measurement technique. Conoscopic resolution is typically degraded if the light emanating from a source region is the product of both specular and diffuse reflection of the illuminating light.

Accordingly, for this and other metrological techniques, it is desirable to overcome speckle and to distinguish, in detection, between diffuse and specular components of light reflected by an illuminated surface.

SUMMARY OF THE INVENTION

In accordance with a preferred embodiment of the present invention, there is provided a method for enhancing the proportion of diffusely scattered light to light specularly reflected from a surface. The method has the steps of receiving a beam of light having a direction of predominant polarization, directing the beam through a wedge module so as to illuminate the scene, and detecting light reflected from the scene. The wedge module has a first optically anisotropic wedge, a second optically anisotropic wedge inclined relative to the first optically anisotropic wedge, and an optical compensation plate having an interface parallel to a face of the first optically anisotropic wedge and a face of the second optically anisotropic wedge so as to compensate any change in optical path of the beam of light. The polarization axes of the first and second wedges are substantially parallel to the direction of predominant polarization of the illuminating beam whereas the light emanating from the illuminated surface in a perpendicularly polarized direction is detected.

BRIEF DESCRIPTION OF THE DRAWINGS

The foregoing features of the invention will be more readily understood by reference to the following detailed description taken with the accompanying drawings, in which.

DETAILED DESCRIPTION OF SPECIFIC EMBODIMENTS

Figure 1:
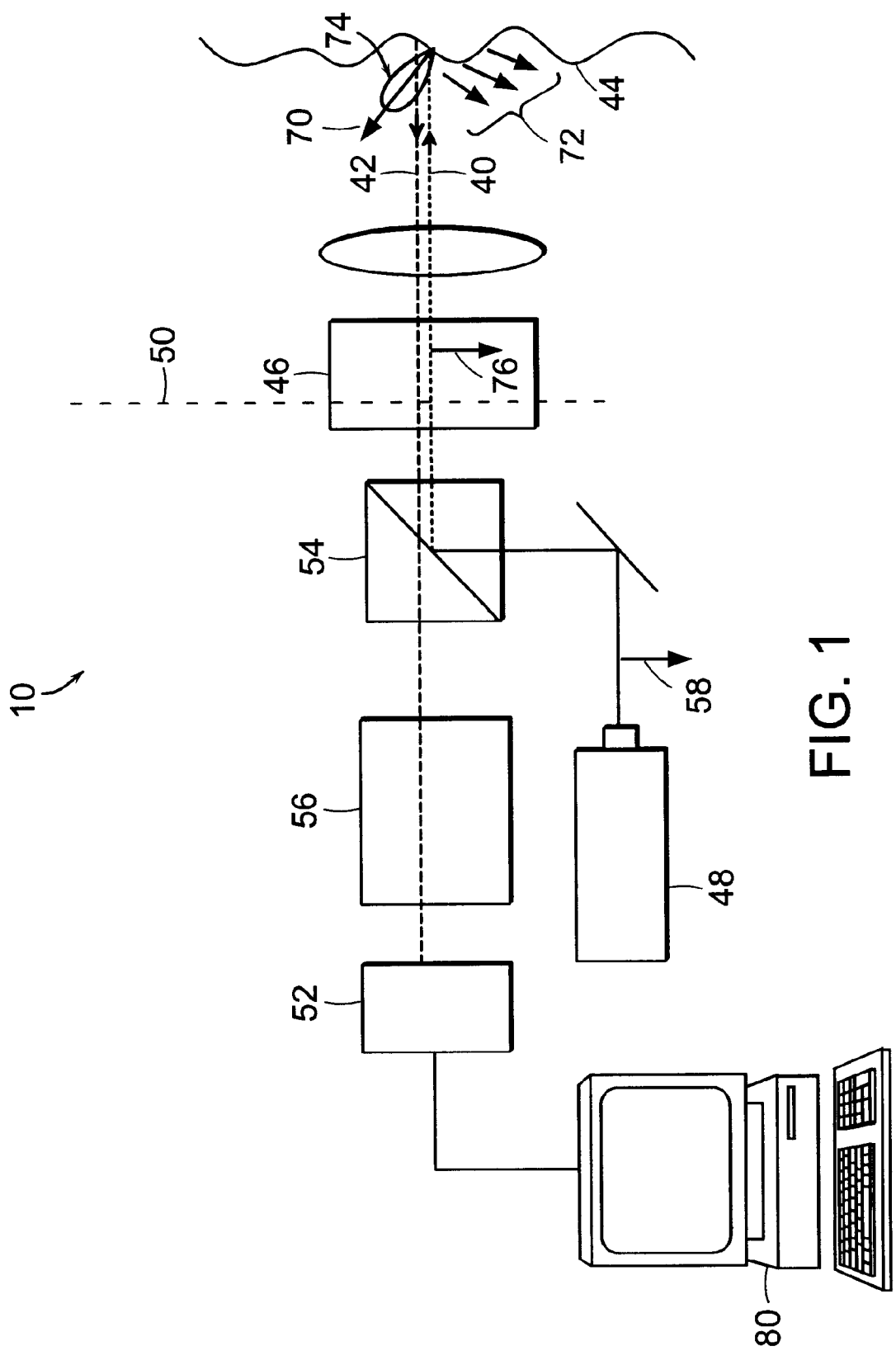
FIG. 1 is a diagram of an optical layout in cross section of a wedge illuminator for providing an illuminating beam of decreased spatial coherence in accordance with an embodiment of the present invention.

A preferred embodiment of the invention is now described with reference to FIG. 1 wherein a diagram shows the optical layout of a wedge illuminator, designated generally by numeral 10. As is well known to persons skilled in the optical arts, speckle from two orthogonal polarizations of incoming light are uncorrelated as are also the speckles from two orthogonal polarizations of reflected light. A projected beam 40 of light and a beam 42 of light reflected from object, scene, or surface 44 are passed through a multiple waveplate 46 consisting of a wedge of a uniaxial crystal, placed at an aperture plane or close to it. An aperture plane refers to a plane where the wavefront of a real image of the optical system is substantially flat.

A source 48 of light, in accordance with a preferred embodiment of the invention, is a laser having a high modal contents such as, for example, a commercially available laser having a bandwidth on the order of 1 nm. Source 48 may be characterized by an axis of predominant polarization, shown, without limitation as the direction indicated by arrow 58, i.e., a direction of polarization in the plane of the paper.

Figure 2:
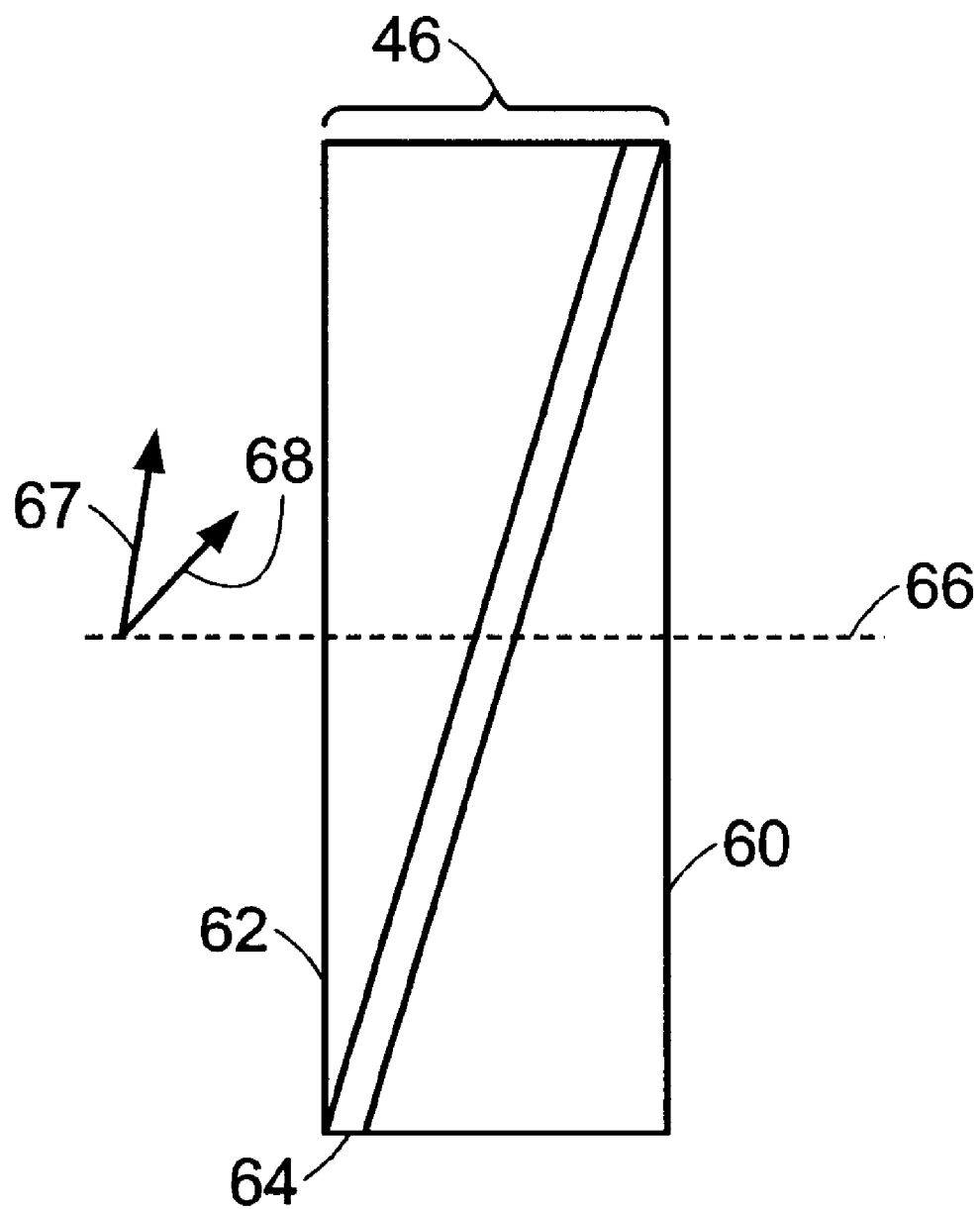
FIG. 2 is a diagram of an optical layout in cross section of a wedge illuminator for providing an illuminating beam of decreased spatial coherence in accordance with an embodiment of the present.

Referring to FIG. 2, waveplate 46 is characterized by an optic axis 66 referring to the axis of the highest degree of rotational symmetry of the crystal. Components of an incident electromagnetic wave having a polarization along an extraordinary axis 67 will be retarded with respect to components having a polarization along an ordinary axis 68. Thus, the polarization of an incident wave will be rotated by the waveplate unless the polarization of the incident wave is precisely aligned with the optic axis of the crystal.

The spectral resolution of a light source, as used herein, is defined as the ratio of central wavelength to bandwidth. As known to persons skilled in the optical arts, if the waveplate count, i.e., the number of waves at a given wavelength that the ordinary ray is retarded in the medium relative to the extraordinary ray, is higher than the spectral resolution of the laser, then the radiation of the laser is split, by waveplate 46, into different wavelength regions with different speckle behavior, since temporal coherence is destroyed, as discussed by McKechnie at pp. 154 ff.

For example, for a 1-nm spectral bandwidth for a 685 nm laser, a calcite plate of 6 mm will have a difference of 2.17 waves between the lowest and highest spectral wavelengths and will separate them spatially into almost 5 different bands, each band behaving distinctly from speckle point of view. Referring again to FIG. 1, it can be seen that this effect occurs twice in the system, once on the path 40 of projection and once on path 42 of reflection.

Because of the wedged properties of waveplate 46, light 40 and 42 experience different polarization states depending on lateral position in aperture plane 50, even in the case of completely monochromatic light. The deviation of the optical axis in a wedge is well-known in the art, and is described, for example, by Levi, *Applied Optics*, vol. 1, (New York, 1968), pp. 357–358, which reference is incorporated herein by reference.

This effect, as well, occurs twice in the system, once on the path 40 of projection and once on path 42 of reflection. Referring to FIG. 2, wedge 46 is split in two parts, 60 and 62 in order to avoid any optical path change and any double refraction effect. Wedge 46 is further compensated optically by a glass plate 64, as known to persons skilled in the optical arts, creating a module which consists optically of two planar plates inclined one relative to the other. The use of displaced wedges of anisotropic material to cancel differential optical path change is described in Born & Wolf, *Principles of Optics*, (7$^{th}$ ed., 1999), pp. 820–23, which treatise is incorporated herein by reference.

Referring again to FIG. 1, in order to image surface 44 or otherwise characterize the distance to the surface from a fiducial reference, reflected light 42 is coupled to optical detector 52, via polarizing beam splitter 54 and anisotropic crystal 56. Optical detector 52 is shown, by way of example, as a detector array used for conoscopy, as described in detail in U.S. Pat. Nos. 4,602,844, 4,976,504, 5,081,540, and 5,081,541. However, reflected light 42 may be used, within the scope of the present invention, with any component or system for imaging or measurement of an illuminated object or scene.

Due to illumination by beam 40, three components of light emanate from surface 44. These include a first specularly reflected component 70, which obeys the laws of reflection from an electrically conducting surface. The polarization vector is identically conserved upon reflection and the angle of reflection is equal and opposite the angle of incidence as measure with respect to a normal to surface 44 at the point of incidence. A second component 72 is diffusely scattered with an angular distribution dependent upon the local properties of surface 44. A third component represented by lobe 74 is referred to as the diffuse lobe and is close in both polarization and direction to the metallic (or specular) reflection.

On metallic surfaces, the diffuse lobe may be advantageously be used for certain applications such as conoscopy and other metrological applications in which the distance to a point on surface 44 is being measured. Under these circumstances, it is desirable to distinguish the diffuse lobe component from the specularly reflected component.

In accordance with an embodiment of the invention, polarization axis 76 of wedge module 46 is coaligned with the direction 58 of predominant polarization of incident beam 40. Thus, the polarization of the incident beam is not rotated upon incidence, nor is the polarization of the specularly reflected component 70 rotated upon subsequent passage through wedge module 46.

Since the diffuse lobe 74 is slightly elliptically polarized, the elliptical polarization will be enhanced upon traversal of the wedge module. The diffuse lobe thus contributes more, in comparison to the specularly reflected component, to the light polarized perpendicularly (i.e., into the plane of the paper) and thus transmitted through polarizing beam splitter 54 to anisotropic analyzer 56 and detector 52. This effect may thus advantageously be used to enhance the detected signal arising from diffuse lobe 74. Output of detector 52, typically an array of detector elements, may be used to provide an image or metrological data via processor 80 as described, for example, in various U.S. patents that describe techniques of conoscopy, including U.S. Pat. Nos. 4,602, 844, 4,976,504, 5,081,540, and 5,081,541. Polarizing beam splitter 54, anisotropic analyzer 56, and detector 52 together constitute an analyzer module as described in the referenced patents.

The described embodiments of the inventions are intended to be merely exemplary and numerous variations and modifications will be apparent to those skilled in the art. All such variations and modifications are intended to be within the scope of the present invention as defined in the appended claims.

What is claimed is:

1. A method for enhancing the proportion of light detected from an illuminated surface emanating from a diffuse lobe with respect to light specularly reflected by the surface, the method comprising:

a. receiving an incident beam of light having a direction of predominant polarization;

b. directing the beam through a wedge module having a polarization axis in such a manner as to substantially align the direction of predominant polarization of the beam with the polarization axis of the wedge module; the wedge module including:

i. a first optically anisotropic wedge;

ii. a second optically anisotropic wedge inclined relative to the first optically anisotropic wedge; and iii. an optical compensation plate having an interface parallel to a face of the first optically anisotropic wedge and a face of the second optically anisotropic wedge so as to compensate any change in optical path of light through the wedge module; and c. detecting light reflected from the surface polarized in a direction perpendicular to the direction of predominant polarization of the incident beam.

2. A system for measuring the distance from a fiducial position to a point on a surface, the system comprising:

a. a wedge module having a polarization axis, the wedge module including:

i. a first optically anisotropic wedge;

ii. a second optically anisotropic wedge inclined relative to the first optically anisotropic wedge; and iii. an optical compensation plate having an interface parallel to a face of the first optically anisotropic wedge and a face of the second optically anisotropic wedge so as to compensate any change in optical path of light through the wedge module;

b. a source of light for producing a beam having a direction of predominant polarization substantially parallel to the polarization axis of the wedge module;

c. an analyzer for selecting light reflected from the surface polarized in a direction perpendicular to the direction of predominant polarization of the beam incident on the surface to detect reflected component represented by a diffuse lobe; and d. a measuring module for measuring a distance from the fiducial position to the surface based at least one light reflected in the diffuse lobe.

3. A system in accordance with claim 2, wherein the measuring module comprises a conoscope.

\* \* \* \* \*